United States Patent [19]

Funcik et al.

[11] 4,370,806

[45] Feb. 1, 1983

[54] ELECTRICAL HARNESS FABRICATION APPARATUS

[75] Inventors: Jack F. Funcik, Downers Grove; Joseph C. Bennet, Lisle; Joseph T. Tubbs, Woodridge; Thomas E. Schneider, Burbank, all of Ill.

[73] Assignee: Molex Incorporated, Lisle, Ill.

[21] Appl. No.: 177,108

[22] Filed: Aug. 11, 1980

Related U.S. Application Data

[62] Division of Ser. No. 12,715, Feb. 16, 1980, Pat. No. 4,235,015.

[51] Int. Cl.[3] .............................................. B23P 19/00

[52] U.S. Cl. ......................................... 29/749; 29/748

[58] Field of Search .............. 29/747, 749, 33 M, 748, 29/564.1, 757, 759, 430, 809, 816; 221/268, 269, 270

[56] References Cited

U.S. PATENT DOCUMENTS

| | | | |
|---|---|---|---|
| 3,755,871 | 9/1973 | Nelson, Jr. | 29/430 |
| 4,043,017 | 8/1977 | Folk et al. | 29/759 X |
| 4,126,935 | 11/1978 | Rhines et al. | 29/749 X |
| 4,281,442 | 8/1981 | Senior et al. | 29/564.1 X |

*Primary Examiner*—Lowell A. Larson
*Assistant Examiner*—Carl J. Arbes
*Attorney, Agent, or Firm*—Louis A. Hecht

[57] ABSTRACT

A method and apparatus for making an electrical harness. The harness generally includes at least one connector having a housing with insulation displacement type contacts loaded therein. Each contact is connected to an insulation clad wire, said wires being of different lengths with different segments of insulation removed from the wire ends opposite the connector. The apparatus performs the functions of positioning a connector on a first station, holding the plurality of wires at a second station remote from the first station, moving the connector to the second station so that each contact is in alignment with each held wire, moving the connector toward the held wire so that each wire is simultaneously displaced into its corresponding contact, moving the connector back to the first station and simultaneously drawing a length of wire, forming loops of differing magnitudes in the wires, holding each wire at the second station at the end of each desired length, cutting the insulation of a predetermined segment on each end of each desired length at the second station, cutting all the wires held at the second station, imparting an axial force upon the cut lengths of wire to pull the wire lengths from the second station and strip the cut insulation segment from each end thereof, and ejecting the electrical harness from the first station.

4 Claims, 22 Drawing Figures

ELECTRICAL HARNESS FABRICATION APPARATUS

This application is a division of application Ser. No. 12,715, filed Feb. 16, 1980, and now U.S. Pat. No. 4,235,015 issued Nov. 28, 1980.

BACKGROUND OF THE INVENTION

1. Field of the Invention

The present invention relates generally to a method and apparatus for making an electrical harness of the type including a connector having a housing with insulation displacement type contacts loaded therein, each contact connected to an insulation clad wire.

2. Brief Description of the Prior Art

More and more, manufacturers of electronic products are relying on electrical harnesses employing insulation displacement type contacts to eliminate some of the inefficiencies and costs associated with other types of electrical connections. A typical electrical harness of the type that is gaining wide acceptance is one which generally comprises a connector having a housing with insulation displacement type contacts loaded therein. Each contact is connected to an insulation clad wire. The wires are generally of different lengths with different segments of insulation removed from the wire ends opposite the connector.

Because of the desirability of eliminating labor costs, automatic equipment is now being employed to produce electrical harnesses of the type described. One example of such a machine is disclosed in U.S. Pat. No. 4,136,440 which was granted on Jan. 30, 1979.

Generally, said U.S. Pat. No. 4,136,440 discloses a method and apparatus of making an electrical harness of the type described which:

- positions a connector at a first station,
- simultaneously feeds first ends of a plurality of wires uniformly past a second station to the first station,
- inserts the wires into the connector at the first station,
- forms loops of differential lengths in the wires between the first and second stations,
- presses the wires into channels adjacent the second station having cutting blades therein for severing the insulation on the wires,
- gripping the wires adjacent to second station,
- shearing the wires at the second station, and
- imparting an axial force on the wires to draw the wires past the cutting blades and strip the wire insulation therefrom.

In addition said U.S. Pat. No. 4,136,400 discloses a looping assembly for forming loops of differential lengths in the wires wherein the wires are axially engaged by the looping assembly at points on the wires that are in the same plane perpendicular to the plane of the wires and, therefore, are at the same distance from either one of the two stations. This may be satisfactory for electrical harnesses having relatively wide center spacing between the contacts and wires, e.g., 0.156 inches. However, when attempting to manufacture electrical harnesses having contact center distances such as 0.100 inch or less, the thicknesses of the wire engaging members become a limiting factor when they are in the same plane.

In addition, a relatively sophisticated means of positively driving and feeding the wire is required in U.S. Pat. No. 4,136,440. The wires must be power dereeled between said second and first stations and be driven by suitable wire feeding means.

Further, it is desirable to have an automatic connector loading and electrical harness ejecting means which is not provided for in U.S. Pat. No. 4,136,440. Instead, the connectors are manually loaded to the first station.

SUMMARY OF THE INVENTION

It is, therefore, a principal object of the present invention to provide an improved method of making an electrical harness of the type comprising at least one connector having a housing with insulation displacement type contacts loaded therein, each contact connected to an insulation clad wire. Said method comprises the steps of:

(a) positioning a connector on a first station;

(b) holding at least a number of wires corresponding to the number of contacts at a second station remote from said first station;

(c) moving said connector to said second station so that each contact is in alignment with each held wire;

(d) simultaneously inserting each held wire into its corresponding contact at the second station;

(e) moving said connector back to said first station and simultaneously drawing a predetermined length of wire defined between said connector and said second station; and (f) cutting all the held wires at the second station.

It is another object of the present invention to provide an improved machine to practice the method recited above. The machine is generally of the type including a first station whereat a connector is initially positioned, insertion means for simultaneously displacing each wire into its corresponding contact, a second station remote from said first station having holding means for selectively gripping said wires, and control means for sequentially actuating said insertion means, holding means, and wire cutting means in a given order. The improvement comprising the invention is characterized by a connector carrier for mounting a connector thereon in a given disposition moveable between said first station and said second station in alignment with said wires; said insertion means being located at the second station; and said control means moving said connector carrier from said first station to said second station, actuating said insertion means so that said wires are displaced in its corresponding contacts, releasing said wire holding means, moving said connector carrier back to said first station drawing wire therewith, actuating said wire holding means, actuating the wire cutting means to form a completed electrical harness.

It is another object of the present invention to provide an improved means of forming loops of differing magnitudes in a machine for making an electrical harness of the type described. The machine generally includes a first station whereat a connector is positioned, insertion means for simultaneously displacing each wire into its corresponding contact, a second station having holding means for selectively gripping said wires and means for cutting said wires, a looping assembly intermediate said first and second stations including a plurality of reciprocally mounted wire looping members having wire engaging ends normally spaced from and adapted to axially engage its corresponding wire, each wire looping member being actuable to move from its first spaced position to a second position engaging and forcing its corresponding wire to form a loop of a given magnitude, whereby loops of different magnitudes are formed in said wires, and control means for sequentially actuating said insertion means, holding means, wire cutting means and looping assembly in a given order. The improvement in said looping assembly comprises:

said wire looping members being mounted relative to one another so that said wire engaging ends initially engage each respective wire at different distances from the connector.

It is still another object of the present invention to provide an improvement to an electrical harness making machine to automatically load a new connector to the machine and eject a completed electrical harness from the machine. The electrical harness includes at least one connector with contacts loaded therein. The machine includes a first station whereat a first connector is initially positioned and a completed harness is finally presented. The improvement comprises:

a connector feed station adjacent to said first station whereat a second connector is positioned prior to being positioned at the first station; a load and eject assembly associated between said connector feed station and said first station including a reciprocally mounted connector engaging push member having one portion thereof engaging the second connector at the connector feed station and having another portion thereof engaging the first connector of a completed electrical harness at the first station, said connector engaging push member being actuable to move in a direction from the connector feed station toward the first station so that the second connector at the connector feed station is moved to the first station while, at the same time, the completed electrical harness is ejected from the opposite end thereof; and control means for actuating said load and eject assembly after a completed electrical harness is presented to the first station.

DESCRIPTION OF THE PREFERRED EMBODIMENT

I. INTRODUCTION

Looking at FIGS. 1 and 3–11, the electrical harness machine, generally designated 10, of the present invention is shown. The machine 10 is intended to automatically produce a completed electrical harness, generally designated 12, as shown in FIG. 2.

Figure 2:
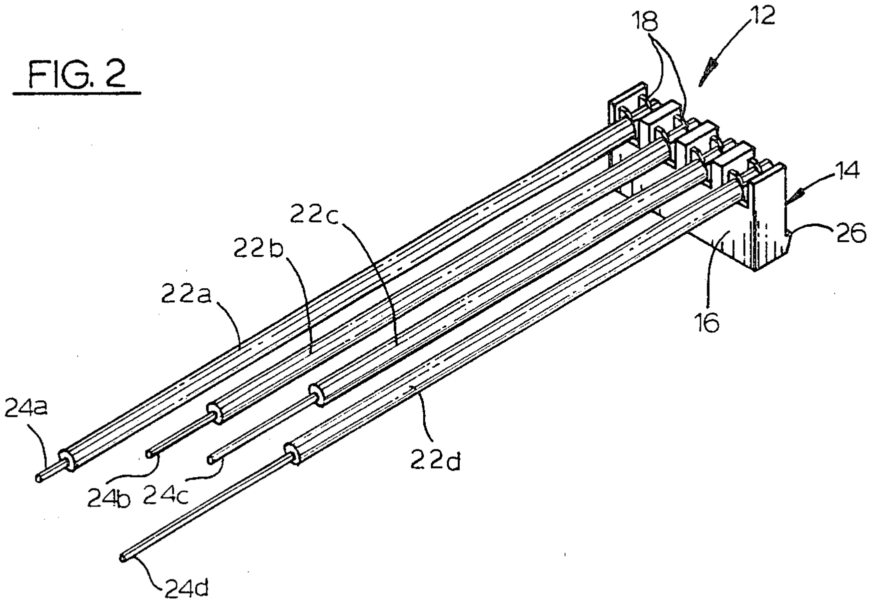
FIG. 2 is a perspective view of a completed electrical harness made according to the method and apparatus of the present invention.

Looking at FIG. 2 the electrical harness 12 is seen to generally include a connector, generally designated 14, comprising an insulated housing 16 having a plurality of insulation displacement type contacts 18 preloaded therein. The housing 16 has a lip 26 formed thereon for purposes which will become more apparent hereinafter.

Each contact 18 has the usual insulation displacement type slit 20 (FIGS. 12 and 13) which is adapted to slice through the insulation of insulation clad wire lengths *22a, 22b, 22c* and *22d* connected thereto. Each end of the wire lengths *22a, 22b, 22c* and *22d* has an exposed stripped conductor portion *24a, 24b, 24c* and *24d* thereon. When discussing all the wire lengths *22a, 22b, 22c* and *22d* as a whole, reference numeral 22 will be used.

The wire lengths *22a, 22b, 22c* and *22d* are of differing magnitude. Likewise, the exposed conductor portions *24a, 24b, 24c* and *24d* are also differing magnitudes. However, it is to be understood that the method and machine to be described hereinafter can be employed to make electrical harnesses wherein the wire lengths and exposed conductor portions are equal or wherein no exposed conductor is present at all. It is also understood that although a four circuit connector 14 is illustrated in the drawings, any size connector can be used.

II. BRIEF DESCRIPTION OF THE ELECTRICAL HARNESS MAKING MACHINE

Looking once again at FIGS. 1 and 3–11, the machine 10 is seen to generally include a first station, generally designated 28, and a second station, generally designated 30, remote from said first station. A connector 14 is initially positioned at the first station 28 and a finished electrical harness 12 is ejected therefrom later in the electrical harness fabrication operation.

The wires 22 are connected to the insulation displacement contacts 18 at the second station 30. In addition the ends of the wire 22 are cut and stripped at the second station 30.

The connector 14 is positionable on a connector carrier, generally designated 32, which is moveable between the first station 28 and the second station 30. The connector carrier 32 includes a generally U-shaped connector nest, generally designated 34, having an opening 38 formed in the bottom thereof for purposes which will become more apparent hereinafter. The nest 34 is adapted to move between the first station 28 and the second station 30. A carrier drive 42 is provided to move the nest 34 between said first station 28 and said second station 30.

A plurality of free-rolling wire reels 44 are provided on the side of the second station 30 opposite the first station 28. The wire 46 fed from the reels 44 are threaded through a wire guide 48 to the second station 30.

Looking at FIGS. 3-11 the second station 30 is seen to have an upper mounting assembly 50 and a lower mounting assembly 52. More particularly, each mounting assembly is moveable between an "up" position and "down" position in response to an upper mounting assembly drive 62 and a lower mounting assembly drive 68, respectively.

In order to hold the wire 46 at the second station 30 there is provided wire holding means in the form of upper and lower wire gripping members 54 and 56, respectively. The upper wire gripping member 54 is secured to the upper mounting assembly 50 for movement therewith between its up and down positions. The lower wire gripping member 56 is stationary throughout all the operations of the machine 10. Thus, when the upper mounting assembly 50 is in its down position, the wire gripping members 54 and 56 hold the wire 46 at the second station 30. When the upper mounting assembly is in its up position, the wire gripping members 54 and 56 are spaced apart thereby releasing the wire.

Mounted adjacent the upper and lower wire gripping members 54 and 56 is an insulation displacement insertion blade 58 of a configuration that is well-known in the art. The insertion blade 58 is secured to the upper mounting assembly 50 for movement therewith.

A plurality of upper insulation cutting blades 60 are fixed on the upper mounting assembly 50 for movement therewith for cutting the insulation of the ends of the wires comprising the electrical harness. There is one insulation cutting blade for each circuit or wire length 22. It is to be noted that the blades 60 are not only aligned with each circuit wire, but, as shown, are in different longitudinal dispositions with respect to one another. This is required for stripping different lengths of insulation from the ends of the electrical harness wire lengths 22.

The lower mounting assembly 52 has a wire shearing blade secured thereto for movement therewith. The shearing blade 64 is capable of cutting a wire when a wire is pinched between the blade and the side surface of the insertion blade 58. This occurs when the upper mounting assembly 50 is in its down position and the lower mounting assembly 52 is in its up position.

The lower mounting assembly 52 also has a plurality of lower insulation cutting blades 66 secured for movement therewith. Each of the lower insulation blades 66 is in alignment with the upper insulation cutting blades 60 and will cooperate to cut insulation at the ends of the wire lengths 22 when the upper mounting assembly 50 is in its down position and the lower mounting assembly is in its up position.

Comprising a portion of an insertion means is a connector moving means 70 associated with but not connected to the lower mounting assembly 52. The connector moving means 70 is mounted for reciprocal movement between an "up" position and a "down" position and is adapted to engage a connector 14 at the second station 30 to move the connector upwardly toward the insertion blade 58. The connector moving means 70 is moveable in response to an insertion drive 72.

A looping assembly, generally designated 74, is located intermediate the first station 28 and the second station 30. The looping assembly 74 is provided to form loops in wire lengths 22 which are stretched between the first and second stations 28 and 30 in a manner which will be described in greater detail hereinafter.

The looping assembly 74 generally includes a plurality of looping members 76 one for each circuit wire. At the bottom of each of the looping members 76 is a wire engaging roller 78, respectively. The looping members 76 are adjustable with respect to one another and, when adjusted, are reciprocally mounted as a unit for downward movement between a first position spaced above the wire lengths 22, a second position wherein the rollers 78 engage the wire lengths 22 and impart a downward axial force on the wire lengths 22, and a third position further downward from the second position.

Below each circuit wire there is provided a bottom support roller 80 forming a part of the looping assembly 74 which are adapted to engage the underside of each circuit wire when the looping members 76 are actuated for downward motion. The entire looping assembly 74 is actuated in response to a looping assembly drive 82.

Located adjacent the first station 28 is a load and eject assembly, generally designated 84. (Not shown in FIG. 1. See FIGS. 12 and 13.) The load and eject assembly 84 generally includes a connector magazine 86 which stores a plurality of connectors 14 for positioning, one at a time, at a connector feed station, generally designated 88, (FIGS. 12 and 13) immediately adjacent to the first station 28. A push member 90 is provided to engage a connector 14 located at the connector feed station 88 and push it into the connector nest 34 after a completed electrical harness 12 is presented at the first station 28. At the same time the push member 90 loads the new connector 14 into the connector nest 34, the push member 90 engages the completed electrical harness 12 to eject it from the connector nest 34 in response to a load and eject drive 92.

III. METHOD OF FABRICATION

In operation, a sequencing control 94 actuates each of the drives 42, 62, 68, 72, 82 and 92 in a sequence which will produce the desired completed electrical harness 12. Several control buttons 96 (FIG. 1) can be provided to manually overide or stop the sequence.

Figure 3:
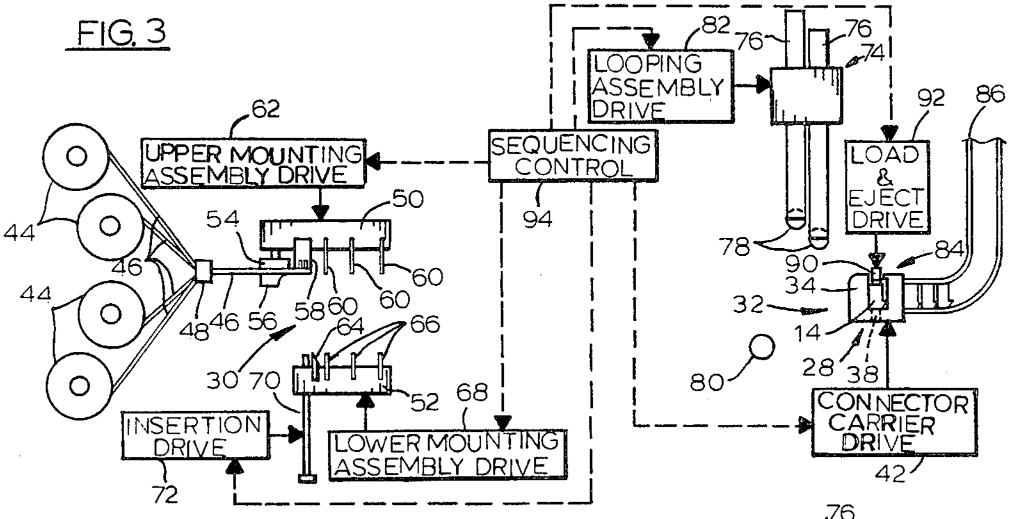
FIGS. 3–11 are schematic flow diagrams illustrating the method of the present invention.

Initially, the machine 10 commences operation in the configuration illustrated in FIG. 3. At this point, the wire 46 from the wire reel 44 has been threaded through the wire guide 48 to the second station 30 whereat it is held by the upper and lower wire gripping members 54 and 56. The upper mounting assembly 50 in its down position and the lower mounting assembly 52 is also in its down position. The connector nest 34 is at the first station 28 having a connector 14 loaded therein. The looping assembly 74 is likewise in its first position.

Figure 4:
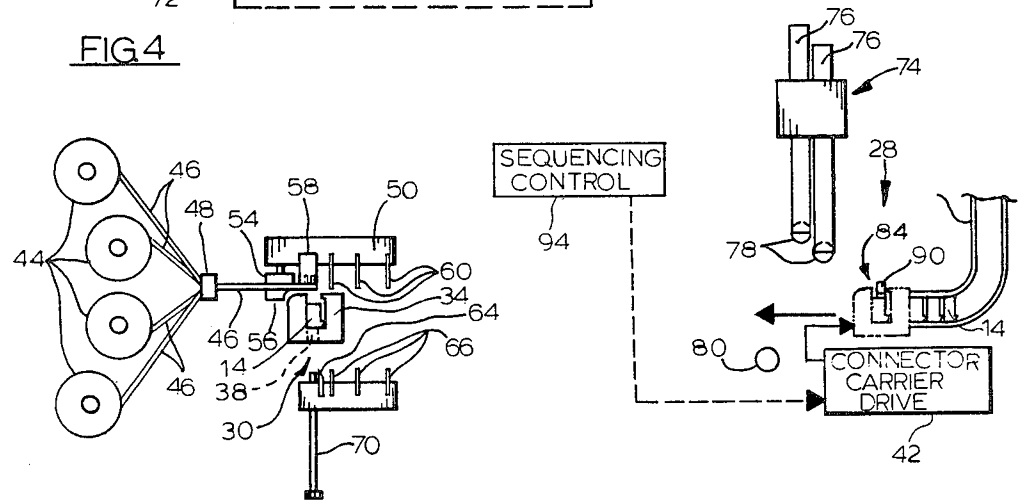
Figure 5:
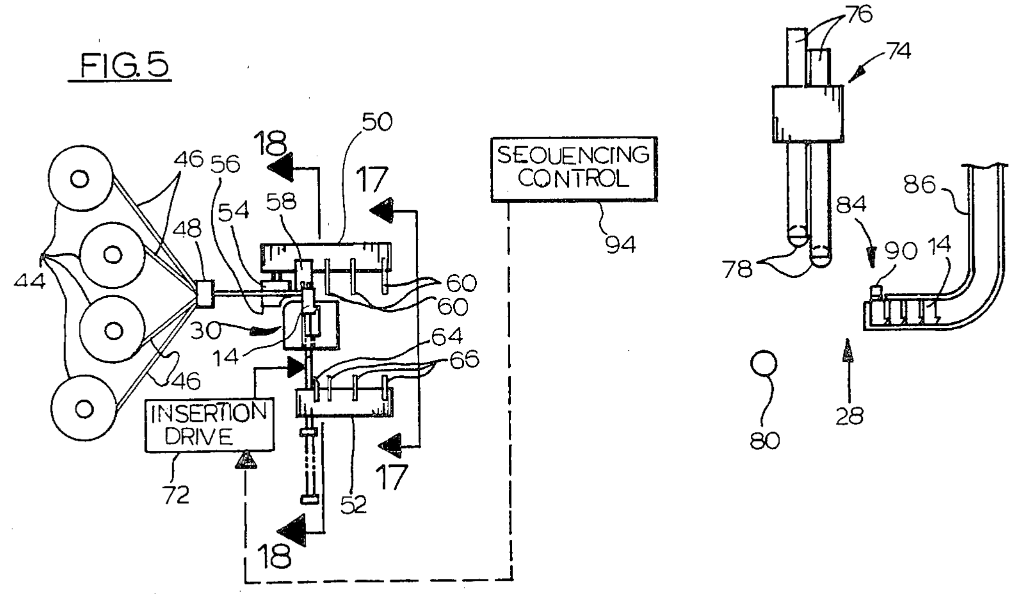

When the machine 10 commences operation, the connector nest 34 is moved from the first station 28 to the second station 30 as is shown in FIG. 4. The connector moving means 70 is then actuated so that it is received through the opening 38 in the connector nest 34 to engage and move the connector 14 upwardly toward the insulation displacement insertion blade 58 as is shown in FIG. 5.

Figure 6:
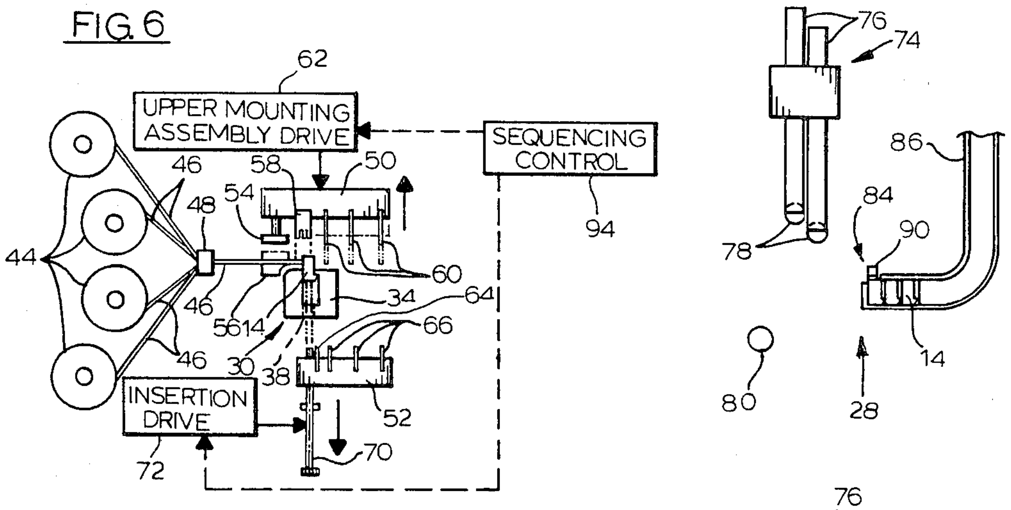

The connector moving means 70 is then reciprocally retracted and the upper mounting assembly 50 assumes its up position. Because the upper mounting assembly 50 assumes its up position, the upper and lower wire gripping members 54 and 56 release the wire and the insertion blade is lifted out of engagement with the wire as is shown in FIG. 6.

It is to be noted that the connector 14, which originally was seated at the bottom of the nest 34, is now in a raised position because of the connection to the wire lengths 22. The connector 14 assumes this raised position for the remainder of the harness making cycle.

Figure 7:
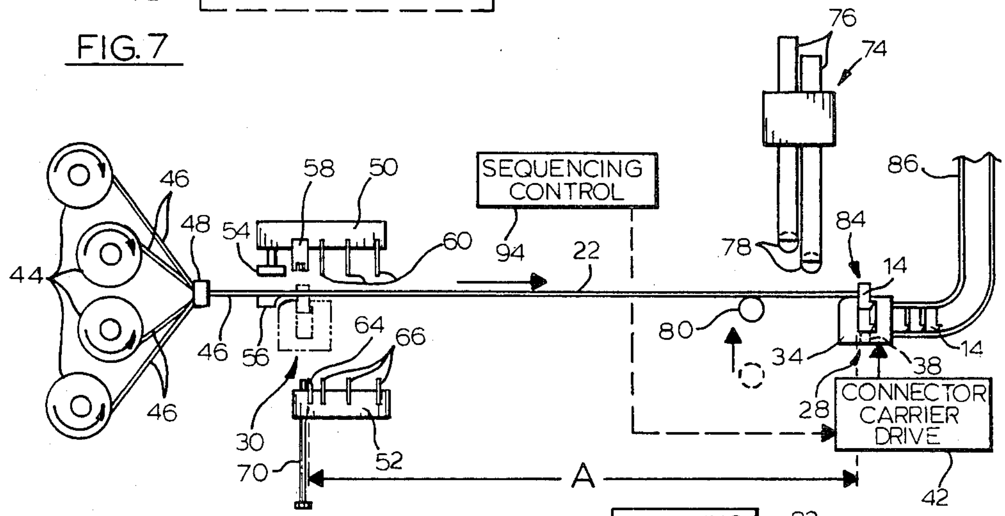

As is shown in FIG. 7, the connector nest 34 is then moved from the second station 30 to the first station 28. Because wires are connected to the contacts 18, a length of wire is drawn from the reels 44 without any positive or power driving force applied to the wires themselves. As a result no sophisticated or extra mechanism is required to power feed the wires to measure out a given length designated A in FIG. 7, which is defined between the connector 14 at the first station 28 and the shearing blade 64 at the second station 30. Also, when this occurs the bottom support roller 80 is brought upwardly to support the wire lengths 22.

Figure 8:
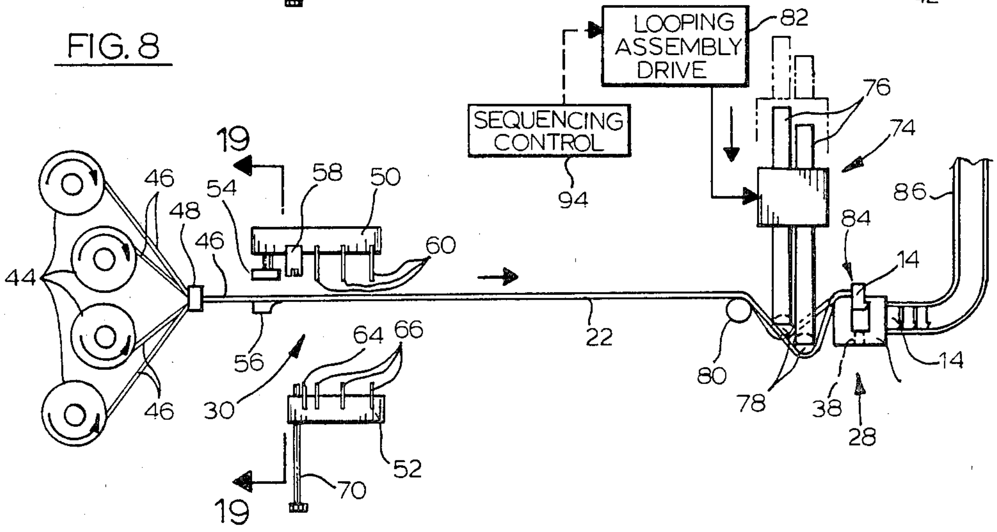

The first predetermined length of wire, A, is the same for all the circuits. In order to form differing lengths of wire for the different circuits, the looping assembly 74 is then actuated by the looping assembly drive 82 so that the looping members 76 move from its first position above the wire lengths 22 to its second position engaging and forcing its corresponding wire length 22 to form a loop of a given magnitude, whereby loops of different magnitudes are formed in the wire lengths 22 as is best shown in FIG. 8. As a result, a desired length of wire, designated B in FIG. 9, is defined between the connector 14 at the first station 28 and the shearing blade 64 at the second station 30, the difference in lengths being attributable to the different magnitudes of the loops.

Figure 9:
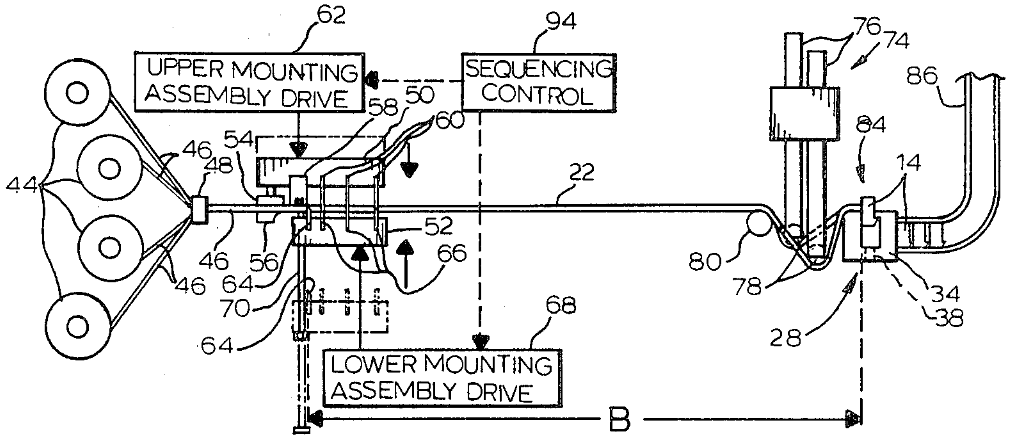

In the next step of operation shown in FIG. 9, the upper and lower mounting assemblies 50 and 52 move toward each other so that the upper mounting assembly 50 in its down position and the lower mounting assembly 52 is in its up position. This produces three results: (a) the upper and lower insulation cutting blades 60 and 66, respectively, cut the insulation at a predetermined location on the end of the wire lengths 22 opposite the connector 14; (b) the insertion blade 58 and wire shearing blade 64 cooperate to cut all the wire lengths 22 at the end of the desired length; and (c) the upper and lower wire gripping members 54 ad 56 hold the wire 46 preparatory to the next harness making cycle.

Figure 10:
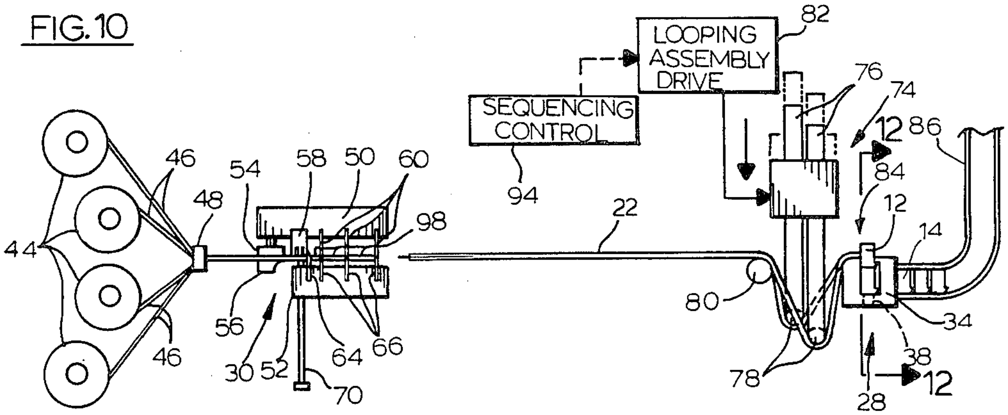

The looping assembly 74 is then actuated a second time to move the looping members 76 to its third position against the wire lengths 22 imparting an axial force on the cut wire lengths 22. When this occurs, the ends of the wire lengths 22 are pulled out from their respective insulation cutting blades 60 and 66 stripping the insulation segments 98 therefrom and freeing the ends of the wire lengths 22 from the second station 30 as is shown in FIG. 10. At this point, a finished electrical harness 12 is positioned in the connector nest 34. A new connector 14 has already been positioned at the connector feed station 88 (FIG. 12) at a height lower than the connector 14 of the completed electrical harness 12.

Figure 11:
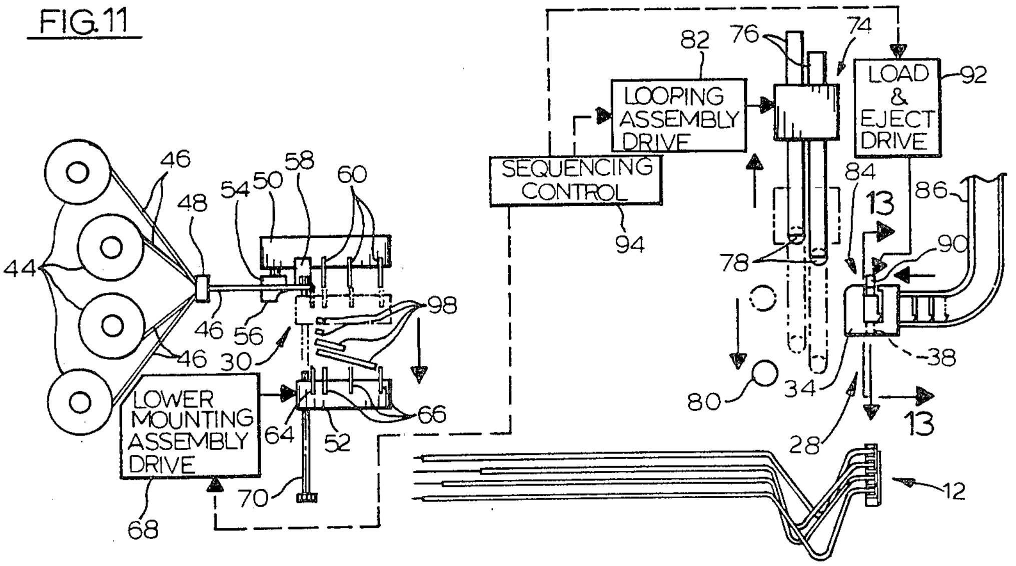

Looking at FIG. 11 the last step of the harness making cycle removes the segments of insulation 98 from the second station 30, positions the looping assembly 74 back to its initial position wherein the looping members 76 and the bottom support roller 80 is spaced from the wire lengths 22. In addition, the load and eject assembly 84 is actuated by the load and eject drive 82 so that the push member 90 ejects the completed electrical harness 12 from the connector nest 34 and loads a new connector 14 from the connector feed station 88 into the connector nest 34. The machine 10 is now ready to repeat the cycle.

IV. CONNECTOR CARRIER

Figure 14:
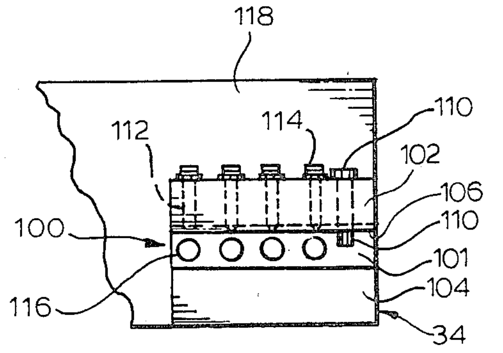
FIG. 14 is a top plan view of a portion of the connector carrier of the present invention showing an empty connector nest.

Looking at FIG. 14, the connector nest 34, comprising a portion of the connector carrier 32, is seen to have an elongated U-shaped connector receiving channel, generally designated 100, defined by a floor 101 and two upstanding side walls 102 and 104 extending therefrom. Side wall 102 has a lip 106 (FIG. 15) overhanging a portion at the top of the connector receiving channel 100.

Side wall 102 has a plurality of locating holes 108 one of which will be used to receive a locating pin 110. The locating pin 110 is long enough so the end thereof will extend partially into the connector receiving channel 100. The portion of pin 110 extending into the connector receiving channel 100 serves as a locating stop for a connector 14 that is loaded therein. By changing the location of the pin 110 into another locating hole 108, different sized circuit connectors can be received and correctly aligned within the connector receiving channel 100.

Side wall 102 has a plurality of holes (not referenced) extending therethrough, each hole receiving a spring loaded positioning pin 112 therein. Each positioning pin 112 has a biasing force exerted by a leaf spring 114. The ends of the locating pins 110 extend partially into the connector receiving channel 100 to press against the connector housing 16 and aid in positioning a connector 14 vertically in the channel and keeping the connector in proper alignment with respect to the held wires 46 at the second station 30.

The opening 38 discussed with respect to the method of the present invention, is in the form of a plurality of holes 116 formed in the floor 101 of the nest 34. These holes 116 will receive the connector moving means 70 as will be discussed in greater detail hereinafter.

The connector nest 34 is secured to a mounting plate 118 for movement therewith. The mounting plate 118 has a plurality of holes 120 formed therein which correspond and align with the holes 116 formed in the floor 101 of the connector nest 34 as is best shown in FIGS. 12 and 13.

Figure 1:
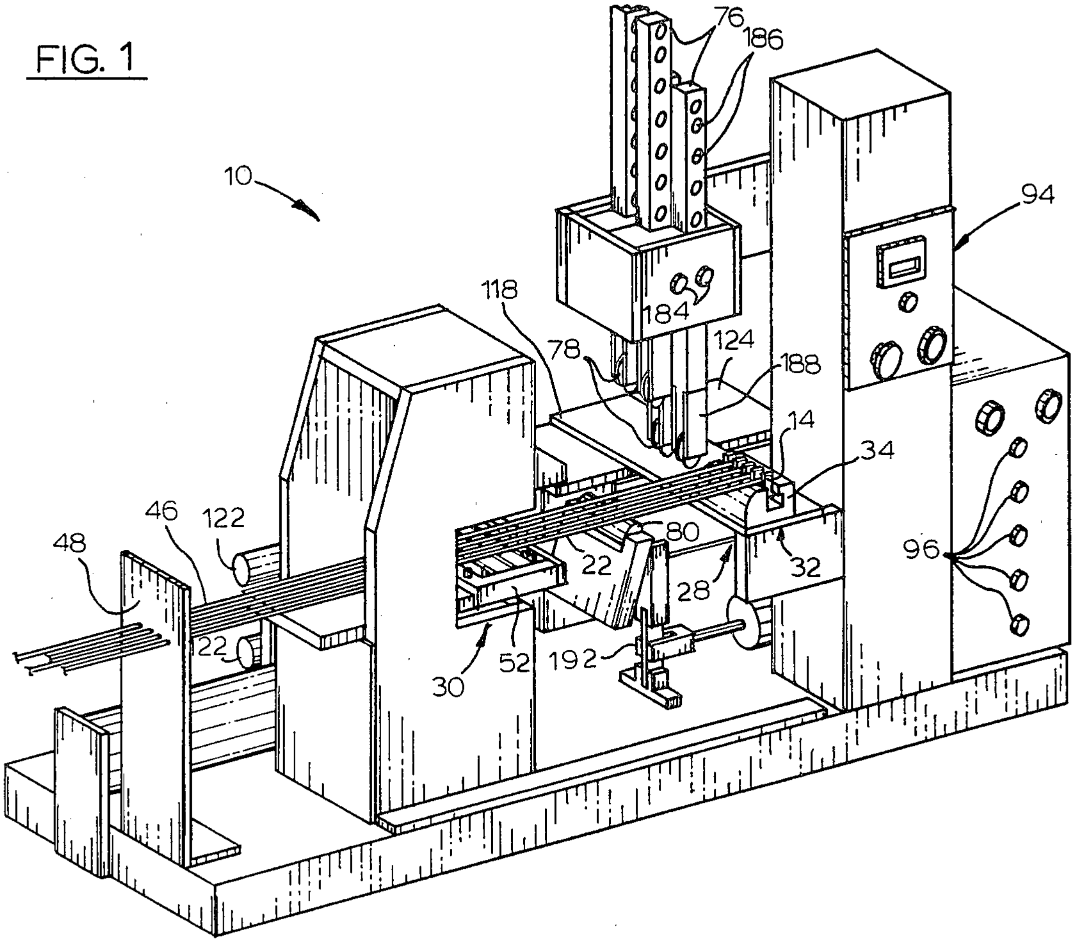
FIG. 1 is a perspective view of the machine of the present invention.
Figure 15:
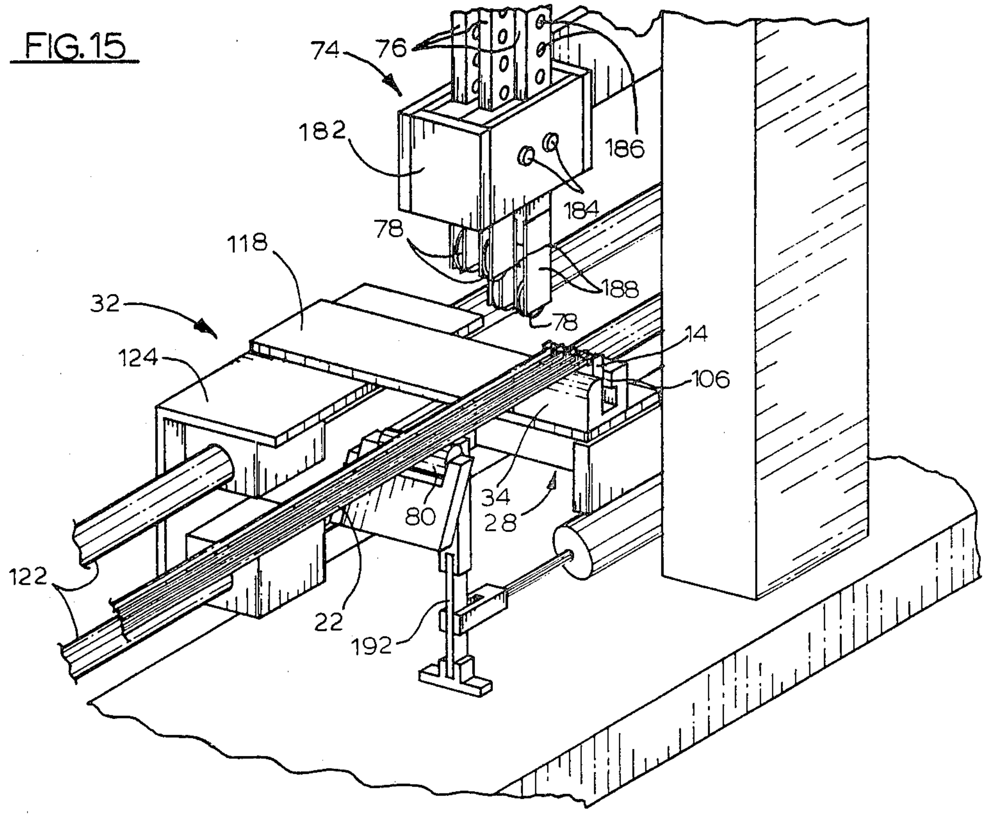
FIG. 15 is a perspective view of the looping assembly of the present invention shown in a first position.

The mounting plate 118 is mounted for movement on a pair of transport rails 122 extending between the first station 28 and the second station 30 by means of a bracket assembly 124 as is best shown in FIGS. 1 and 15. The connector nest 34, mounting plate 118 and bracket assembly 124 move as a single unit throughout the entire harness fabrication cycle on the rails 122 in response to the connector carrier drive 42.

V. FIRST STATION

Figure 12:
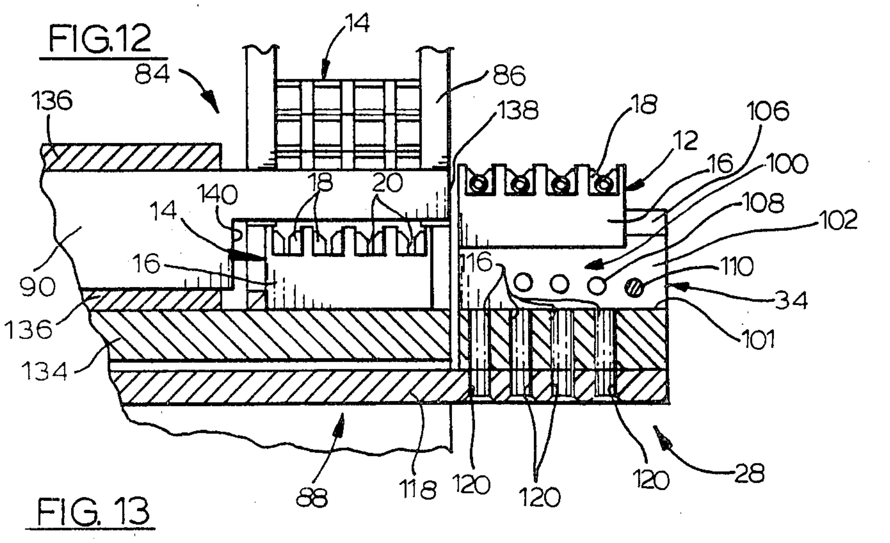
FIG. 12 is a side sectional view of the load and eject assembly and first station of the machine of the present invention during the step of the harness fabrication cycle depicted in FIG. 10.
Figure 13:
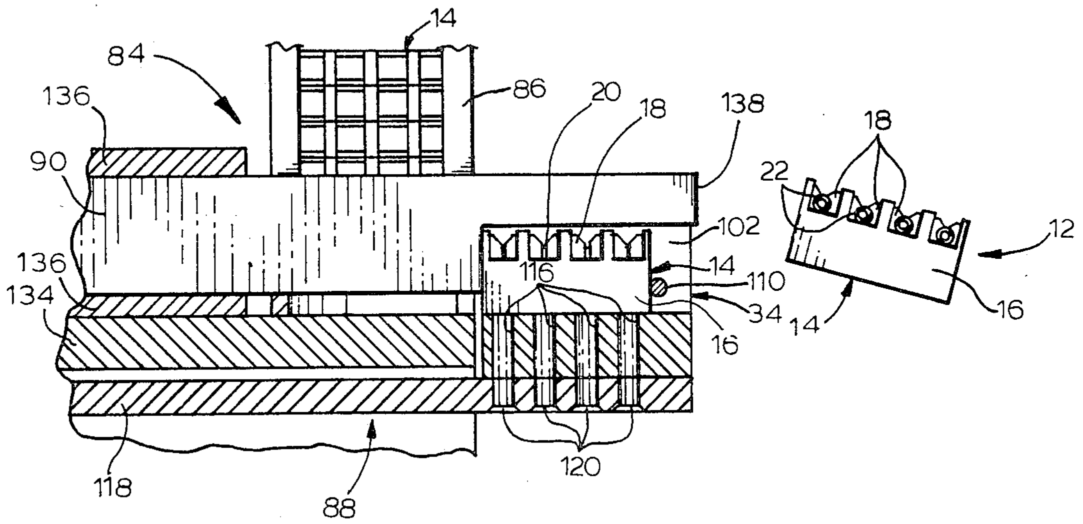
FIG. 13 is a sectional view of the load and eject assembly and the first station of the machine of the present invention during the step of the harness fabrication cycle depicted in FIG. 11.

FIGS. 12 and 13 show the apparatus located at or near the first station 28 of the machine 10 of the present invention. More particularly, the load and eject assembly 84 is illustrated in FIG. 12 during the step of the fabrication operation depicted in FIG. 10 while FIG. 13 illustrates the step of the harness fabrication operation depicted in FIG. 11.

The load and eject assembly 84 is seen to generally include a connector magazine 86 having a plurality of preloaded connectors 14 stored therein for disposition, one at a time, at a connector feed station, generally designated 132, located immediately adjacent to the first station 28. The connector feed station 88 is defined over a platform plate 134 which overlies the mounting plate 118 of the connector carrier 32. Means of dispensing the connectors 14 to the feed station 88 is disclosed in U.S. Pat. No. 4,087,908 assigned to the assignee of the present invention.

The push member 90 is mounted reciprocally in a sleeve 136 adjacent to the connector feed station 88. The push member 90 is stepped in configuration having an upper harness engaging surface 138 and a lower connector engaging surface 140.

Figure 21:
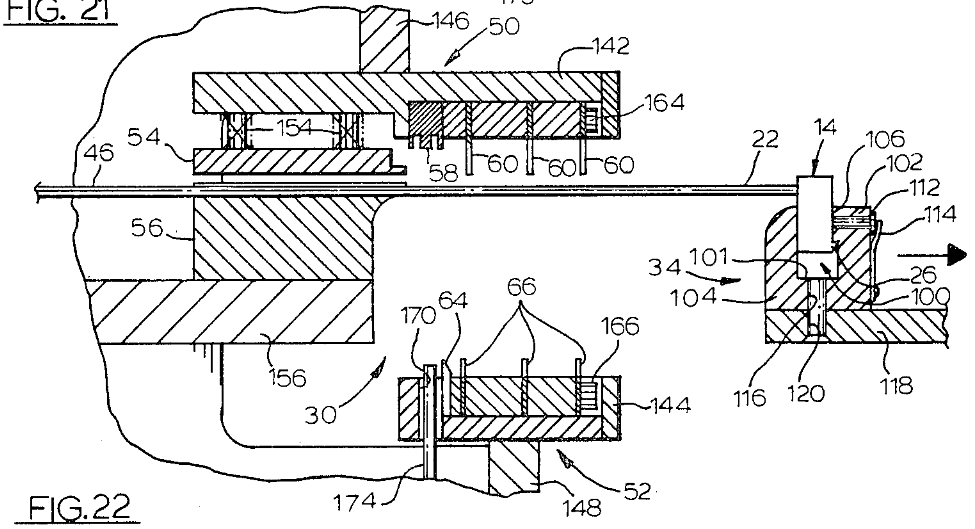
FIG. 21 is a sectional view of the second station of the machine of the present invention during the step of the harness fabrication cycle depicted in FIG. 7.

As was discussed before, when a completed electrical harness 12 is presented at the first station 28, it is in a relatively raised position off the floor 101 of the connector nest 34. The connector 14 of the harness 12 is held in this disposition by virtue of the spring loaded positioning pins 112 as is best shown in FIG. 21. A new connector 14 has meanwhile been dispensed on the platform 134 at the connector feed station 88 as is shown in FIG. 12.

The push member 90 is then actuated by the load and eject drive 92 so that the push member 90 moves to the right looking at FIG. 12. When this occurs, the harness engaging surface 138 engages and poshes the raised completed electrical harness 12 from the connector receiving channel 100. The electrical harness 12 avoids the locating pin 110 because of its raised position. At the same time, the connector engaging surface 140 engages and pushes the new connector 14 from the connector feed station 88 into the connector receiving channel 100 of the connector nest 34 as is best shown in FIG. 13. The new connector 14 is pushed until it abuts against the locating pin 110. The push member 90 is then retracted back to the position shown in FIG. 12.

VI. SECOND STATION

FIGS. 17–22 show different views of the second station and the associated apparatus thereat at different steps during the harness fabrication cycle. As has been discussed, one end of the wire lengths 22 are inserted into the contacts 18, and the other ends of the wire lengths 22 are cut and insulation stripped.

The upper and lower mounting assemblies 50 and 52 are seen to include upper & lower mounting shoes 142 and 144, respectively. The upper mounting shoe 142 is associated with the upper mounting assembly drive 62 by means of member 146 while the lower mounting shoe is associated with the lower mounting assembly drive 68 by means of member 148.

The means of gripping or holding the wire 46 is best shown in FIGS. 19–22. The upper wire gripping member 54 is mounted on an upper gripper mounting block 152 with a pair of spring members 154 mounted therebetween. Thus mounted, the upper wire gripping member 54 moves with the upper mounting shoe 142.

The lower wire gripping member 56 is secured to a lower gripper mounting block 156 which is stationary relative to the upper mounting shoe 142. Thus, it is only the upper wire gripping member 54 which moves with respect to the lower wire gripping member 56 to effect a gripping or released position.

Figure 19:
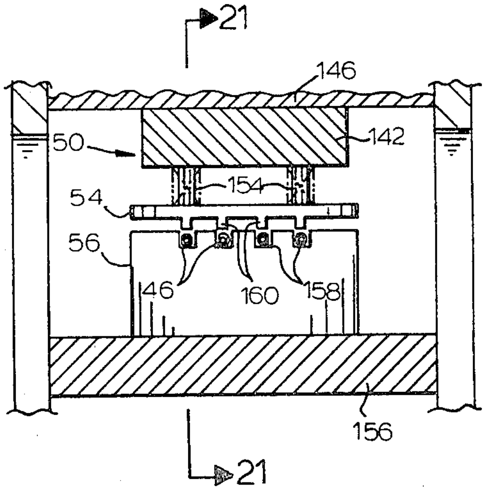
FIG. 19 is a sectional view of the second station of the machine of the present invention taken generally along the line 19—19 of FIG. 8.

Looking at FIG. 19, the lower wire gripping member 56 is seen to include a plurality of wire receiving channels 158 in which wire 46 is aligned and guided. The upper wire gripping member 54 has a plurality of complementary corresponding protrustions 160 which are partially receivable within the channels 158 to press against the wires 46 therein when the wire gripping members 54 and 56 are in a gripped or holding position. When the wire gripping members 54 and 56 are in a released position as is shown in FIG. 19 the bottom of the protrusions 160 are just above the wire receiving channels 158 so that the wires 46 cannot inadvertently move out of the channels while the wire is being pulled. When the wire gripping members 54 and 56 are in a gripped or holding position, as is shown in FIGS. 20 and 22, the protrusions 160 resiliently engage the tops of the wires 46.

Figure 20:
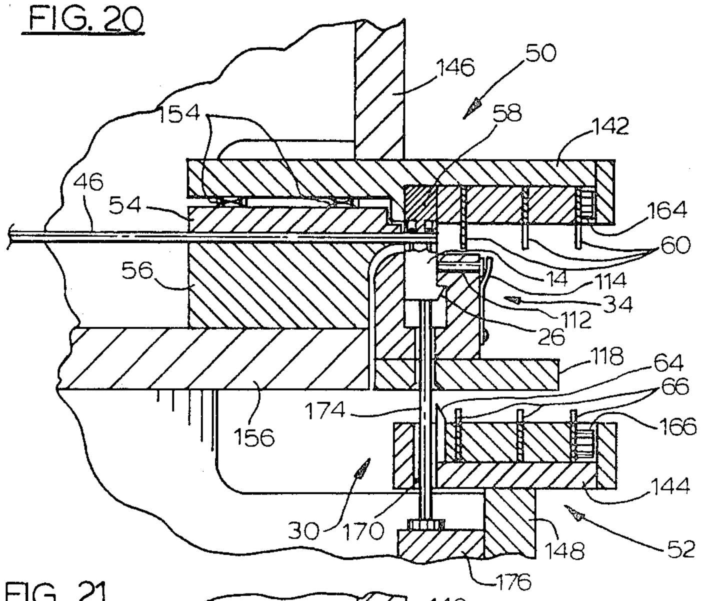
FIG. 20 is a sectional view taken generally along the line 20—20 of FIG. 17.
Figure 22:
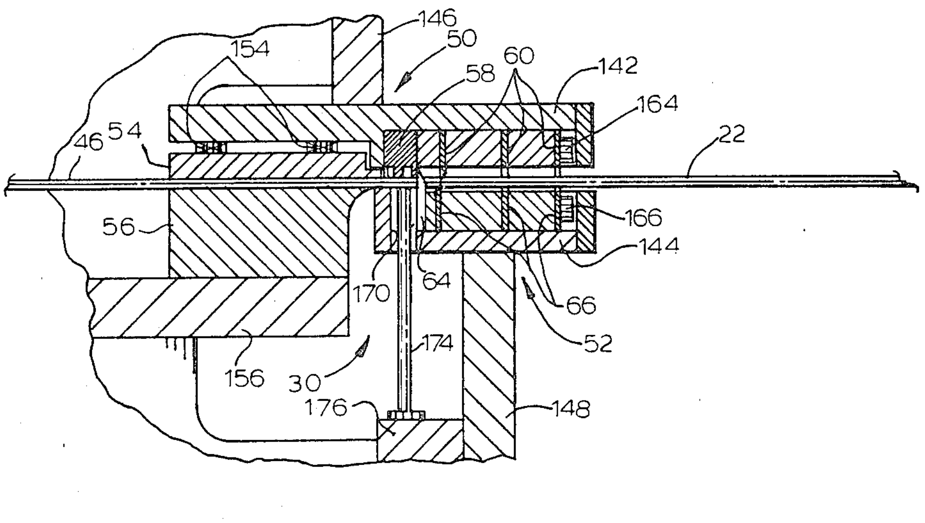
FIG. 22 is a sectional view of the second station of the machine of the present invention during the step in the harness fabrication cycle depicted in FIG. 9.

Looking at FIGS. 20–22, the four upper insulation cutting blades 60 and the insertion blade 58 are mounted on the upper mounting shoe 142 by means of a mounting pin 164. The four lower insulation cutting blades 66 and the wire shearing blade 64 are mounted on the lower mounting shoe 144 by means of another mounting pin 166.

Immediately adjacent the wire shearing blade 64, a plurality of insertion pin receiving holes 170 are provided for alignment with the holes 116 and 120 formed in the connector carrier 32. Receivable through holes 116, 120 and 170 are a plurality of corresponding insertion pins 174 mounted on a reciprocally moving support 176 which together comprise the connector moving means 70.

Figure 18:
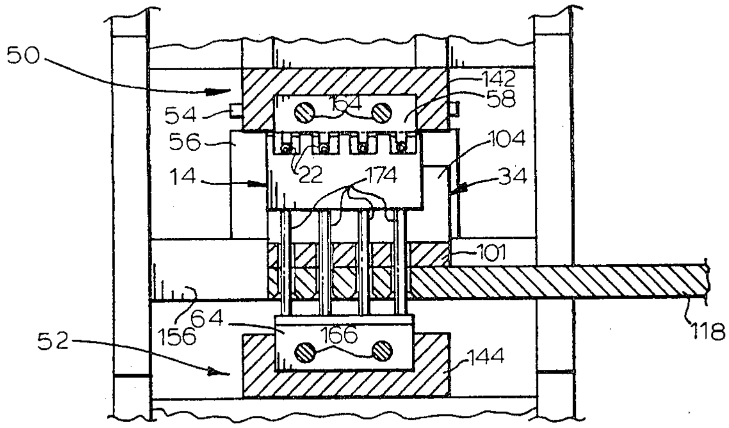
FIG. 18 is a sectional view of the second station of the machine of the present invention taken generally along the line 18—18 of FIG. 5.

When the connector nest 34 reaches the second station 30 preparatory to insertion, holes 116, 120 and 170 are aligned immediately above insertion pins 174. When the insertion step takes place as is depicted in FIGS. 6 and 20, the support 176 is raised in response to the insertion drive 72 to move pins 174 upwardly to engage the bottom of the connector 14 inside the connector receiving channel 100 of the connector nest 34. During this step in the cycle, the insertion blade engages the tops of one end of the wire lengths 22 as is best shown in FIG. 18. The upward force imparted by the pins 174 against the connector 14 causes the slits 20 of the insulation displacement contacts 18 to slice through the insulation to provide an electrical connection between the contact 18 and the conductor of the wire lengths 22.

The connector 14 remains in the raised position shown in FIG. 20 by virtue of the sideward force provided by the spring loaded positioning pins 112. The connector 14 thereafter cannot move upwardly out of the housing because of the abutment of the housing lip 26 against the connector nest lip 106.

Thereafter, the insertion pins 174 are retracted and the connector carrier 32 moves the nest 34 back to the first station 38 as is shown in FIG. 21. Then, as will be discussed in greater detail hereinafter, loops are formed in the wire lengths 22 which presents the opposite ends of the wire lengths 22 at the second station 30 for cutting and stripping as is depicted in FIGS. 9 and 22.

As is shown in FIG. 22, the upper mounting assembly 50 assumes its down position while the lower mounting assembly assumes its up position. When this occurs, the wire shearing blade 64 cooperates with the insertion blade 58 to cut the ends of the wire lengths 22. At the same time the upper and lower insulation cutting blades 60 and 66, respectively, cut through the insulation. When an additional axial force is applied by the looping assembly 74, it can be appreciated that the cut wire lengths 22 are pulled from the second station 30 past the upper and lower insulation cutting blades 60 and 66 to strip the insulation from the ends of the wire lengths 22. It is understood that the insulation cutting blades 60 and 66 can be mounted on their respective mounting pins 164 and 166, in any given longitudinal disposition with respect to one another to provide for differing exposed conductor segments at the end of the wire lengths 22.

VII. LOOPING ASSEMBLY

Figure 16:
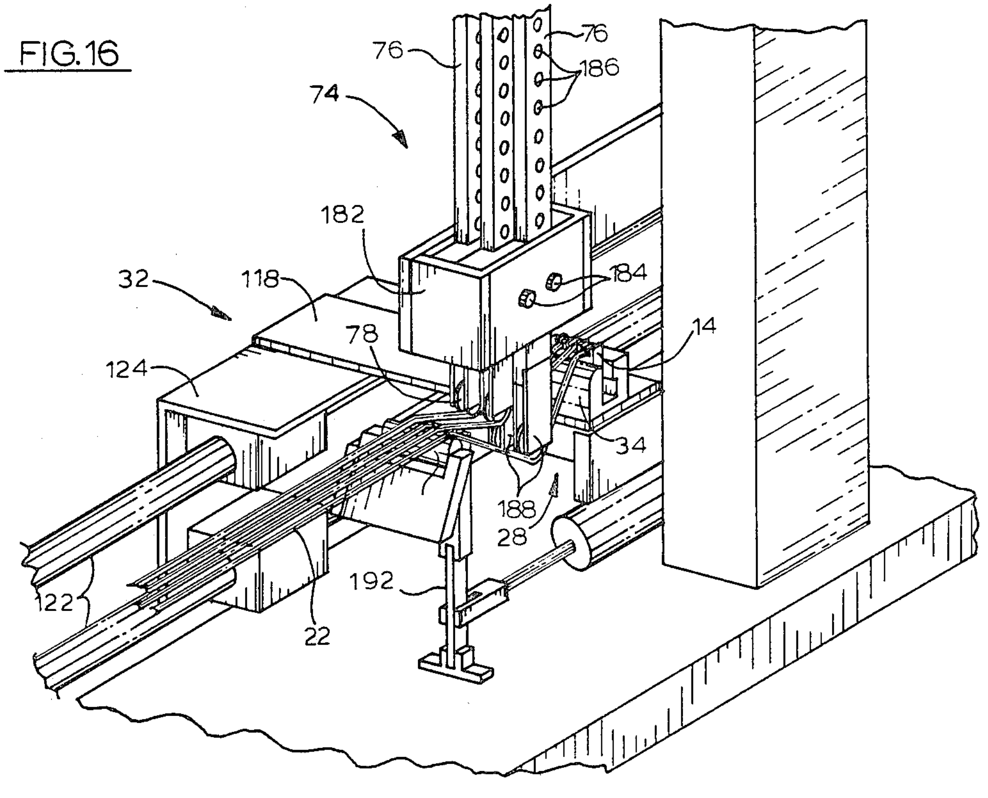
FIG. 16 is a perspective view of the looping assembly of the present invention shown in a second position.
Figure 17:
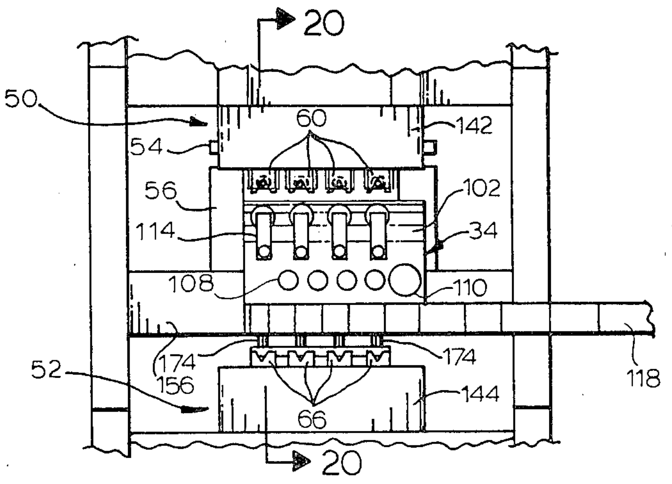
FIG. 17 is a view of the second station of the machine of the present invention taken generally along the line 17—17 of FIG. 5.

Turning now to FIGS. 15 and 16 the looping assembly 74 is shown during the two steps of the harness fabrication cycle depicted in FIGS. 7 and 8. The looping assembly 74 performs the function of forming loops in the wire lengths 22 of differing magnitudes and then imparting the necessary axial force to strip the insulation from the ends of the wire lengths 22.

As is seen in FIGS. 15 and 16, the wire looping members 76 are secured to a frame 182. The frame 182 has a pair of mounting pins 184 receivable therethrough to cooperate with locating holes 186 formed in each looping member 76. By pulling out pins 184 and moving the looping members 76 upwardly or downwardly as desired, one is able to adjust the amount of downward distance a particular wire length 22 will be forced when the looping assembly 74 assumes its second position as shown in FIG. 16.

The wire engaging rollers 78 are mounted at the bottom of its corresponding looping member 76 between two depending plates 188. Each wire engaging roller 78 has an inverted rounded contour to receive the wire length 22 therein in a rolling fashion.

The bottom support roller 80 is supported by a pivoting bottom roller assembly 192 which is driven by the looping assembly drive 82. The bottom roller 80 supports the wire lengths 22 in a rolling fashion so that a more accurate measurement of the wire lengths 22 can be achieved while, at the same time, reducing any friction when the looping members 76 exert the axial force against the wire lengths 22. The reduction of friction is desirable to prevent any inadvertent pull out of the wire lengths 22 from their respective contacts 88.

The looping members 76 are staggered with respect to each other so that the wire engaging roller 78 of each looping member 76 engages its respective wire length 22 at a different distance from the connector 14 than the adjacent wire engaging roller. The staggered configuration, as shown in FIGS. 15 and 16, allows for closer contact spacing in the connector 14.

The looping assembly 74 is adapted to go to its third position (FIG. 10) from the second position shown in FIG. 16. When this occurs, the ends of the wire lengths 22 are pulled from the second station 30 as is shown in FIG. 10.

VIII. APPLICATIONS

The machine 10 and method of the present invention can be employed in a number of different applications. For example, the machine can be adjusted over a wide variety of parameters to produce wire lengths of different magnitudes or the same magnitude. The insulation removed ends of the wire lengths 22 opposite the connector 14 can be the same magnitude, different magnitudes or not be stripped at all.

Depending on the size of the connector nest 34 and its connector receiving channel 100, a wide variety of circuit sized connector 14 can be used. In addition, two connectors 14 can be loaded in the nest 34 at the same time.

It can also be appreciated that a large variety of wire reels 44 can be used which correspond to the number of connector circuits. However, the number of reels 44 and wire 46 eminating therefrom can be greater than the number of connector circuits. For example, there can be ten reels 44 and ten wires 46 being held at the second station 30 for a four circuit connector 46 being held at the second station 30. In such a case, because of the structure and method of the machine 10, only those four wires 46 which are in alignment with the contacts 18 of the connector 14 will be dereeled because those wires would be the only ones connected to a contact. Thus, it would not be necessary, when changing connector circuit sizes to thread an additional number of wires 46 to the second station 30.

We claim:

1. In a machine for making an electrical harness,
   said harness comprising at least one connector with contacts loaded therein, each contact connected to a wire,
   said machine including a first station whereat a first connector is initially positioned and a completed electrical harness is finally presented,
   the improvement comprising:
   a connector feed station adjacent to said first station whereat a second connector is positioned prior to being positioned at the first station;
   a load and eject assembly associated between said connector feed station and said first station including a reciprocally mounted connector engaging push member having one portion thereof engaging the second connector at the connector feed station and having another portion thereof engaging the first connector of a completed electrical harness at the first station, said connector engaging push member being actuable to move in a direction from the connector feed station toward the first station so that the second connector at the connector feed station is moved to the first station while, at the same time, the completed electrical harness is ejected from the opposite end thereof; and
   control means for actuating said load and eject assembly after a completed electrical harness is presented to the first station.

2. The machine of claim 1 including a generally U-shaped connector nest at the first station having an open ended elongated connector receiving channel therein for slidingly holding a connector, said load and eject assembly loading said second connector into said channel at one end thereof and ejecting said completed electrical harness from the opposite end thereof.

3. The machine of claim 2 wherein said connector nest includes means adjacent the bottom of said channel to locate a connector within the channel and means for positioning within the channel above said locating means, whereby said second connector is loaded at a lower disposition than the completed electrical harness is ejected.

4. The machine of claim 1 including a connector feeding assembly adjacent the connector feed station for dispensing a connector thereat one at a time for each electrical harness cycle.

* * * * *